US012731274B2

(12) United States Patent
Kido et al.

(10) Patent No.: US 12,731,274 B2
(45) Date of Patent: Sep. 8, 2026

(54) EXTERNAL ENVIRONMENT RECOGNITION DEVICE

(71) Applicant: HITACHI ASTEMO, LTD., Hitachinaka (JP)

(72) Inventors: Hideaki Kido, Tokyo (JP); Hirotomo Sai, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 279 days.

(21) Appl. No.: 18/712,361

(22) PCT Filed: Aug. 24, 2022

(86) PCT No.: PCT/JP2022/031944
§ 371 (c)(1),
(2) Date: May 22, 2024

(87) PCT Pub. No.: WO2023/095403
PCT Pub. Date: Jun. 1, 2023

(65) Prior Publication Data

US 2025/0005775 A1 Jan. 2, 2025

(30) Foreign Application Priority Data

Nov. 26, 2021 (JP) ................................ 2021-192396

(51) Int. Cl.
*G06T 7/50* (2017.01)
*G06T 7/11* (2017.01)
*G06V 20/56* (2022.01)

(52) U.S. Cl.
CPC .................. *G06T 7/50* (2017.01); *G06T 7/11* (2017.01); *G06V 20/588* (2022.01); *G06T 2207/30256* (2013.01)

(58) Field of Classification Search
CPC ... G06T 7/50; G06T 7/11; G06T 2207/30256; G06T 2207/30261; G06V 20/588; G06V 20/58; G08G 1/166; G01C 3/08
See application file for complete search history.

(56) References Cited

U.S. PATENT DOCUMENTS 10,692,379 B2 * 6/2020 Aoki ......................... G06T 7/70
11,024,051 B2 * 6/2021 Gomezcaballero ....... G06T 7/70
(Continued)

FOREIGN PATENT DOCUMENTS

EP 3 246 877 A1 11/2017
JP 2013-109455 A 6/2013
(Continued)

OTHER PUBLICATIONS

International Search Report with English Translation in corresponding International Application No. PCT/JP2022/031944, dated Nov. 8, 2022.

(Continued)

*Primary Examiner* — Aaron W Carter
(74) *Attorney, Agent, or Firm* — Foley & Lardner LLP

(57) ABSTRACT

An external environment recognition device includes: a road surface height estimation unit that estimates a height of a road surface on which an object is positioned in an image captured by a monocular camera installed in a vehicle; a road surface height reliability estimation unit that calculates reliability of a height of the road surface estimated by the road surface height estimation unit; and an object distance information estimation unit that estimates a distance to the object in accordance with the reliability calculated by the road surface height reliability estimation unit, in which the road surface height reliability estimation unit calculates the (Continued)

reliability based on a determination result as to whether the road surface is same as a grounding contact surface of the vehicle.

10 Claims, 9 Drawing Sheets

(56) References Cited

U.S. PATENT DOCUMENTS

| | | | | |
|---|---|---|---|---|
| 2005/0110620 | A1* | 5/2005 | Takeichi | G01S 15/931 701/45 |
| 2008/0219505 | A1* | 9/2008 | Morimitsu | G06V 20/588 382/103 |
| 2014/0142837 | A1* | 5/2014 | Takaki | G08G 1/166 701/301 |
| 2015/0088378 | A1* | 3/2015 | Sugai | B60W 10/22 701/37 |
| 2015/0165972 | A1* | 6/2015 | Takemae | G06V 20/58 348/148 |
| 2017/0220877 | A1* | 8/2017 | Kakegawa | G08G 1/166 |
| 2018/0189599 | A1* | 7/2018 | Sano | G06V 20/58 |
| 2018/0225526 | A1* | 8/2018 | Nanri | H04N 13/204 |
| 2018/0281757 | A1* | 10/2018 | Matsuo | G06V 40/103 |
| 2019/0026572 | A1* | 1/2019 | Theodosis | G06V 20/586 |
| 2019/0266745 | A1* | 8/2019 | Gomezcaballero | G06T 7/12 |
| 2020/0302192 | A1 | 9/2020 | Ogata et al. | |
| 2020/0349366 | A1* | 11/2020 | Takemura | H04N 13/286 |
| 2021/0335000 | A1* | 10/2021 | Kanetake | G06V 10/44 |
| 2021/0350150 | A1* | 11/2021 | An | G06N 3/0895 |
| 2022/0366700 | A1* | 11/2022 | Endo | G06T 7/74 |
| 2023/0070221 | A1* | 3/2023 | Shigemura | G06T 7/60 |
| 2023/0130001 | A1* | 4/2023 | Kim | B60W 40/06 73/65.01 |
| 2024/0046409 | A1* | 2/2024 | An | G06N 3/08 |
| 2024/0412537 | A1* | 12/2024 | Ninomiya | G06T 7/593 |
| 2024/0428556 | A1* | 12/2024 | Lee | G06V 20/588 |
| 2025/0005775 | A1* | 1/2025 | Kido | G06T 7/11 |
| 2025/0029401 | A1* | 1/2025 | Gomezcaballero | G06V 20/588 |
| 2025/0368480 | A1* | 12/2025 | Saito | B66F 9/0755 |

FOREIGN PATENT DOCUMENTS

| | | |
|---|---|---|
| JP | 2017-096777 A | 6/2017 |
| JP | 2017-207881 A | 11/2017 |
| JP | 2019-066333 A | 4/2019 |
| JP | 2021-043141 A | 3/2021 |

OTHER PUBLICATIONS

Japanese Office Action issued in corresponding JP Application No. 2021-192396 dated Nov. 18, 2025 with English translation (12 Pages).

Extended European Search Report issued in corresponding EP Patent Application No. 22898188.2, dated May 23, 2025 (9 pages).

* cited by examiner (a)

(b)

(a)

(b)

(c)

(a)

(b)

(a)

(b)

(a)

(b)

EXTERNAL ENVIRONMENT RECOGNITION DEVICE

TECHNICAL FIELD

The present invention relates to an external environment recognition device.

BACKGROUND ART

In recent years, a technique of performing image recognition of an environment around a vehicle based on a captured image of a camera installed in the vehicle and performing driving assistance based on a recognition result has been developed. In driving assistance, it is important to accurately obtain a distance to an object such as a pedestrian, another vehicle, and a white line.

Camera systems for obtaining a distance to an object based on a captured image include a stereo camera using a plurality of cameras or a monocular camera. The stereo camera can obtain a distance by an overlapping image capturing region commonly captured by a plurality of monocular cameras, and it is desired to obtain a distance to an object by an image captured by a monocular camera that can simplify the configuration of the camera system.

PTL 1 discloses an object distance estimating device including: a determination unit for determining whether or not an object is in contact with the ground surface; an object distance estimation unit for estimating the distance between the object and the imaging device when it is determined that the object is in contact with the ground surface, in which information that indicates the distance to the object estimated by the object distance estimation unit is included, and object detection information that indicates that the object was detected is output.

CITATION LIST

Patent Literature

PTL 1: JP 2021-43141 A

SUMMARY OF INVENTION

Technical Problem

The device described in PTL 1 obtains the distance regardless of whether or not the ground surface in contact with the object is at the same height as the traveling road surface of the vehicle, and an error occurs in the distance to the object.

Solution to Problem

An external environment recognition device according to the present invention includes: a road surface height estimation unit that estimates a height of a road surface on which an object is positioned in an image captured by a monocular camera installed in a vehicle; a road surface height reliability estimation unit that calculates reliability of a height of the road surface estimated by the road surface height estimation unit; and an object distance information estimation unit that estimates a distance to the object in accordance with the reliability calculated by the road surface height reliability estimation unit, in which the road surface height reliability estimation unit calculates the reliability based on a determination result as to whether the road surface is same as a grounding contact surface of the vehicle.

Advantageous Effects of Invention

According to the present invention, it is possible to enhance the accuracy of the distance to an object based on an image captured by a monocular camera.

DESCRIPTION OF EMBODIMENTS

Figure 1:
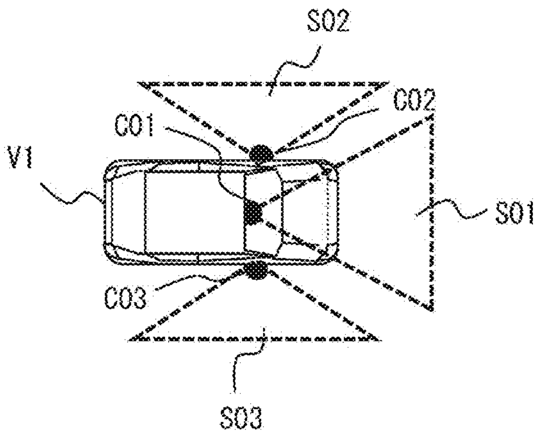
FIG. 1 is a top view of a vehicle in which a camera is installed.

An embodiment of the present invention will be described below with reference to the drawings. The following description and drawings are illustrative of the present invention and are omitted and simplified as appropriate for a clearer description. The present invention can also be carried out in various other forms. Unless otherwise specified, each component may be singular or plural.

For the purpose of facilitating understanding of the invention, the position, size, shape, range, and the like of each component illustrated in the drawings do not necessarily represent the actual position, size, shape, range, and the like. Therefore, the present invention is not necessarily limited to the position, size, shape, range, and the like disclosed in the drawings.

When there are a plurality of components having the identical or similar functions, the identical reference signs may be given different suffixes for explanations. However, if the plurality of components do not need to be distinguished, suffixes are sometimes omitted for explanations.

FIG. 1 is a top view of a vehicle V1 in which cameras C01, C02, and C03 are installed.

The camera C01 installed on the front side of the vehicle V1 captures an image capturing range S01 of the front. The camera C02 installed on the left side of the vehicle V1 captures an image capturing range S02 on the left side. The camera C03 installed on the right side of the vehicle V1 captures an image capturing range S03 on the right side. The cameras C01, C02, and C03 are monocular cameras, and function as a camera system by combining a plurality of monocular cameras. The vehicle V1 is mounted with an external environment recognition device 100 (see FIG. 3), which estimates a surrounding object such as a pedestrian, another vehicle, a white line, and a road surface, and a distance to the object based on captured images acquired by these cameras C01, C02, and C03, determines control amounts such as braking, acceleration, and a steering angle of the vehicle V1 by the estimated distance, and performs driving assistance and the like.

Note that the cameras C01, C02, and C03 will be described with an example of monocular cameras, but as described later, a stereo camera may be installed to complement a captured image by the monocular camera.

There are several methods of estimation of the distance to an object, and representative methods include, when a plurality of cameras capture the same object, a method of direct measurement by the principle of triangulation and a method of measurement by using a time series change of the captured image using motion of the cameras.

On the other hand, representative examples not using these methods include a distance estimation model using road surface grounding contact coordinates of an object on a captured image detected based on the captured image or coordinates of the object on a road surface and height information from the camera to the road surface. In the present embodiment, this distance estimation model is used.

Figure 2:
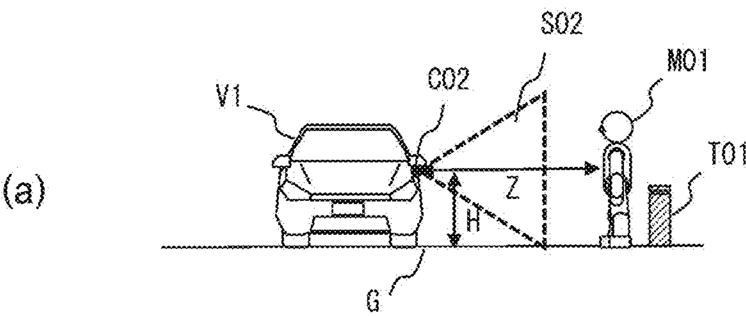
FIGS. 2(*a*) and 2(*b*) are views explaining a distance estimation model.
Figure 2:
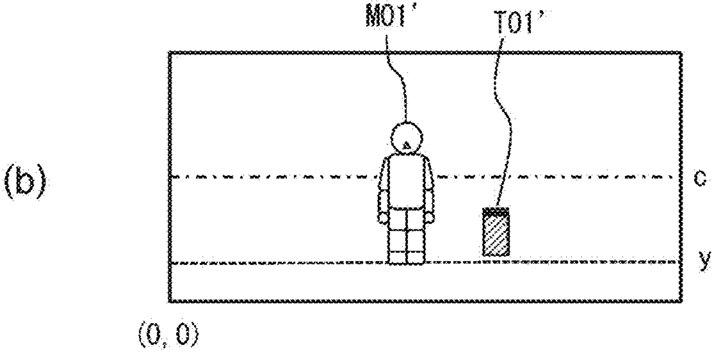

FIGS. 2(*a*) and 2(*b*) are views explaining the distance estimation model.

FIG. 2(*a*) is a front view of the vehicle V1 in which the camera C02 is installed on the left side. FIG. 2(*b*) is an image captured by the camera C02.

FIG. 2(*a*) illustrates an example in which a pedestrian M01 and a pole T01 are present on a sidewalk on the left side of the vehicle V1. The vehicle V1 captures the pedestrian M01 and the pole T01 with the camera C02 while traveling forward. FIG. 2(*b*) illustrates a captured image thereof, and a pedestrian M01' and a pole T01' appear on the captured image.

As illustrated in FIG. 2(*a*), the distance from the installation position of the camera C02 to a grounding contact surface G between the vehicle V1 and the traveling road surface, that is, the height from the camera C02 to the traveling road surface is H, the distance from the installation position of the camera C02 to the pedestrian M01, that is, the object is Z, and the focal length of the camera C02, which is a unique parameter of the camera C02, is f. It is assumed that the grounding contact surface G of the vehicle V1 and the traveling plane of the vehicle V1 are parallel, and the optical axis of the camera C02 is horizontal. In the captured image illustrated in FIG. 2(*b*), the optical center on the captured image is c, and the grounding contact coordinate of the pedestrian M01', which is an object, is y. The present example is indicated by vehicle center coordinates where the lower left of the captured image is the origin (0, 0). In the distance estimation model that estimates the distance to the object detected on the captured image, the distance Z to the object is expressed by the following expression (1).

$$Z = f * H/(c - y) \tag{1}$$

One of the major assumptions in using this expression is that the captured object is present on a road surface having the same height as the traveling road surface of the vehicle V1. If the object detected on the captured image is not present on the road surface at the same height as the traveling road surface, the distance Z to the object cannot be accurately obtained.

For example, when the pedestrian M01 is present on a sidewalk higher than the traveling road surface, an error ΔZ of the distance expressed by the following expression (2) occurs, where the height from the camera C02 to the sidewalk is H'.

$$\Delta Z = f * (H - H')/(c - y) \tag{2}$$

The error ΔZ affects driving assistance or the like of the vehicle V1, and may cause malfunction in, for example, braking or the like. In order to avoid such a malfunction, when the height of the road surface on which the object is grounded is estimated in the object detected on the captured image, it is important to check how reliable the estimation is and correctly reflect the estimation.

Here, a method of obtaining the distance Z to the object based on the object detected on the captured image on the assumption that the traveling road surface including the grounding contact surface G and the optical axis of the camera C02 are horizontal has been described, but in a case where the optical axis is not horizontal to the traveling road surface including the grounding contact surface G, the distance Z may be obtained using geometric conditions such as an installation angle of the camera C02 and a rotation angle with the optical axis. For example, in a case where the grounding contact surface G is not horizontal such as a slope, it is possible to apply the distance estimation model by modeling, with a mathematical expression, the height of the road surface from a white line, paint information on the road surface, or the like, or, with a stereo camera that can acquire distance information, directly calculating the height of the road surface.

Figure 3:
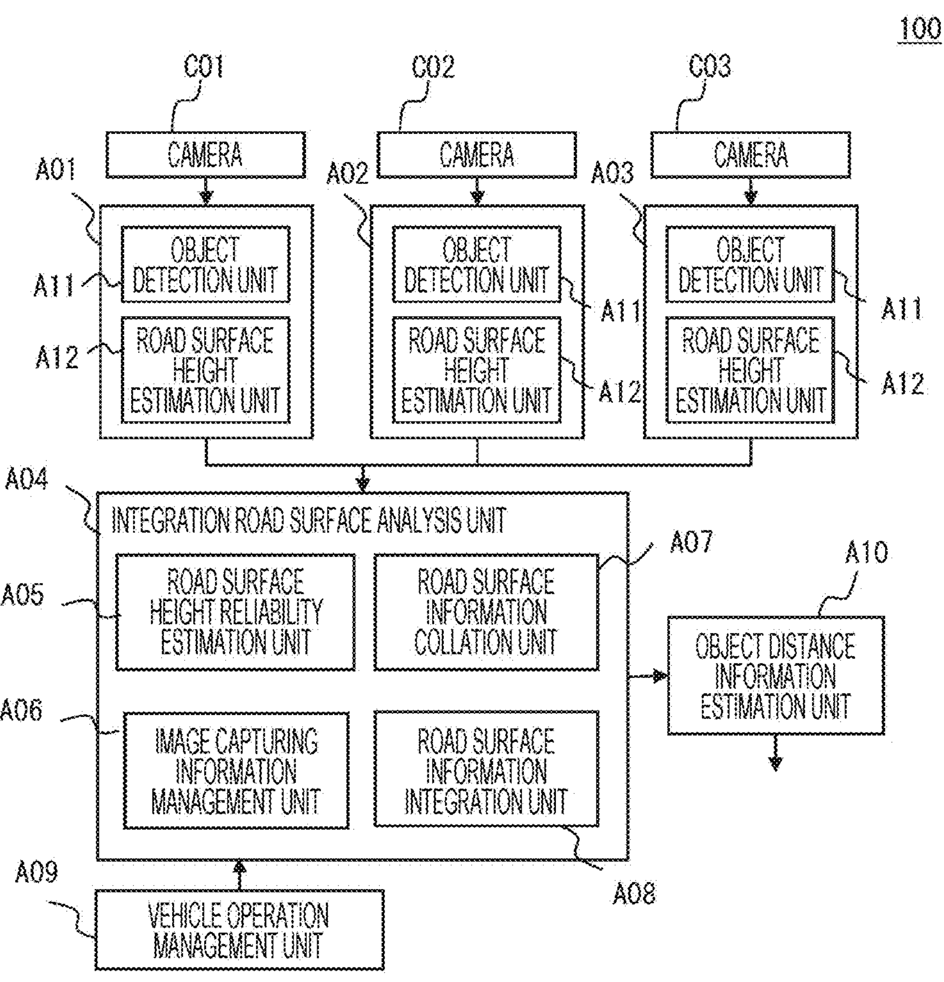
FIG. 3 is a configuration diagram of an external environment recognition device.

FIG. 3 is a configuration diagram of the external environment recognition device 100.

Image analysis units A01, A02, and A03 are included corresponding to the cameras C01, C02, and C03. Each of the image analysis units A01, A02, and A03 includes an object detection unit A11 and a road surface height estimation unit A12. Note that although a case where three cameras are installed in the vehicle V1 is illustrated as an example, four or more cameras may be installed. Also in that case, the image analysis unit (the object detection unit A11 and the road surface height estimation unit A12) is included corresponding to each of the cameras.

The object detection unit A11 analyzes the presence of an object in the images captured by the cameras C01, C02, and C03, and detects the position (coordinates) of the object at vehicle center coordinates on the captured image.

The road surface height estimation unit A12 estimates and outputs, to an integration road surface analysis unit A04, the height of the road surface on which the object is grounded, that is, the object is positioned, based on the position of the object in the captured image detected by the object detection unit A11. For example, when the object is a pedestrian, as illustrated in FIG. 2(*b*), the road surface height estimation unit A12 obtains a grounding contact coordinate y of the pedestrian M01', and discretely outputs the distance to the object and the height of the road surface based on this grounding contact coordinate y, outputs by a model formula, or outputs its effective range (depth, width, and height) together with the captured image.

The integration road surface analysis unit A04 includes a road surface height reliability estimation unit A05, an image capturing information management unit A06, a road surface information collation unit A07, and a road surface information integration unit A08.

The road surface height reliability estimation unit A05 receives an estimated road surface height from the road surface height estimation unit A12 corresponding to each of the cameras C01, C02, and C03, and calculates the reliability of the height of the road surface estimated by the road surface height estimation unit A12. Details will be described later.

The image capturing information management unit A06 manages image capturing conditions of each of the cameras. Specifically, the image capturing information management unit A06 stores and manages information such as a focal length, an optical center, an angle of view, and an image size, which are internal information of the cameras C01, C02, and C03, and information such as an attachment position with respect to the vehicle V1, a rotation angle, and an optical axis direction, which are external information of the cameras C01, C02, and C03.

The road surface information collation unit A07 collates the road surface information detected by the cameras C01, C02, and C03 with one another. Specifically, the road surface information collation unit A07 collates road surface information among the cameras C01, C02, and C03, and collates the road surface information in time series. This road surface information collation unit A07 determines and associates as to which position of road surface information based on an image captured by a certain camera at a certain time corresponds to road surface information based on an image captured by another camera at another time. As a method for this, for example, a method of extracting a feature amount from a captured image and regarding a part where an identical feature amount is extracted as the same position, a method of regarding a part where detection results of an object match as the same position, a method of acquiring and associating attribute information (road, sidewalk, or tree) of an image, or the like is used. These are particularly easy to collate when the object is a stationary object. When this collation is performed in time series, operation information of the vehicle V1 from a vehicle operation management unit A09 is used. The time series association may be simply obtained from only operation information of the vehicle V1 without extracting the feature amount or the like of the captured image.

The road surface information integration unit A08 determines the height of the road surface from the information on the height of the road surface in the road surface height estimation unit A12 corresponding to each of the cameras C01, C02, and C03 and the estimation result of the road surface height reliability estimation unit A05, and stores and manages this in time series.

The vehicle operation management unit A09 and an object distance information estimation unit A10 are connected to the integration road surface analysis unit A04. The vehicle operation management unit A09 manages how much the vehicle V1 has moved in time series, and outputs movement information of the vehicle V1 in time series to the integration road surface analysis unit A04. Upon receiving the height of the road surface with high reliability determined by the integration road surface analysis unit A04, in particular the road surface height reliability estimation unit A05 or the road surface information integration unit A08, the object distance information estimation unit A10 estimates the distance to the object detected by each of the cameras C01, C02, and C03 based on the height of this road surface.

Figure 4:
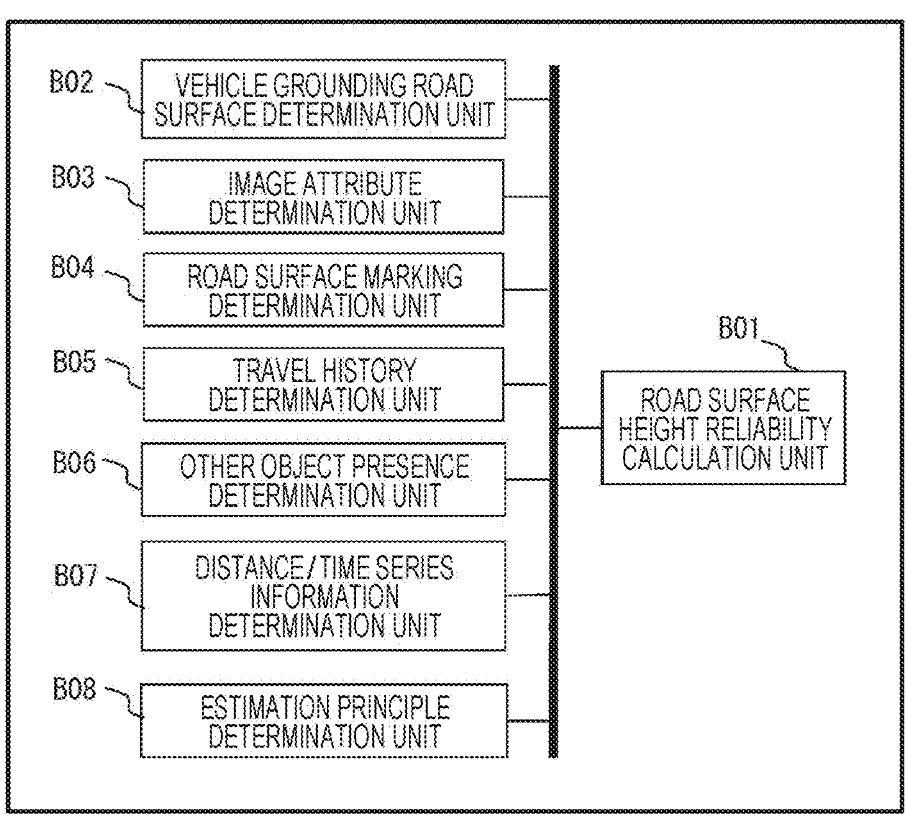
FIG. 4 is a configuration diagram of a road surface height reliability estimation unit.

FIG. 4 is a configuration diagram of the road surface height reliability estimation unit A05.

The road surface height reliability estimation unit A05 includes a vehicle grounding road surface determination unit B02, an image attribute determination unit B03, a road surface marking determination unit B04, the travel history determination an unit B05, other object presence determination unit B06, a distance/time series information determination unit B07, an estimation principle determination unit B08, and a road surface height reliability calculation unit B01.

The road surface height reliability estimation unit A05 performs all or some determinations of the determination units B02 to B08. Then, the road surface height reliability estimation unit A05 calculates reliability of the height of the road surface estimated by the road surface height estimation unit A12.

Hereinafter, the operation of each of the determination units B02 to B08 and the operation of the road surface height reliability calculation unit B01 that has received the determination of result each of the determination units B02 to B08 will be described.

The vehicle grounding road surface determination unit B02 determines whether the grounding contact surface G is included in captured images output from the cameras C01, C02, and C03. The operation of the vehicle grounding road surface determination unit B02 will be described with reference to FIGS. 5(*a*), 5(*b*), and 5(*c*).

Figure 5:
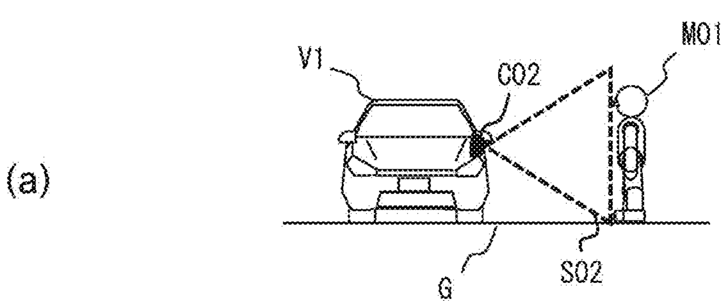
FIGS. 5(*a*), 5(*b*), and 5(*c*) are views illustrating examples of installation positions of cameras.
Figure 5:
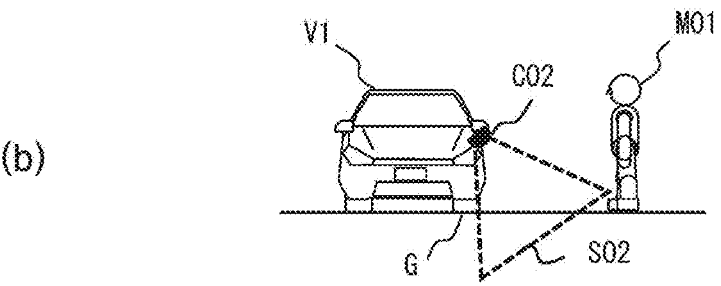
Figure 5:
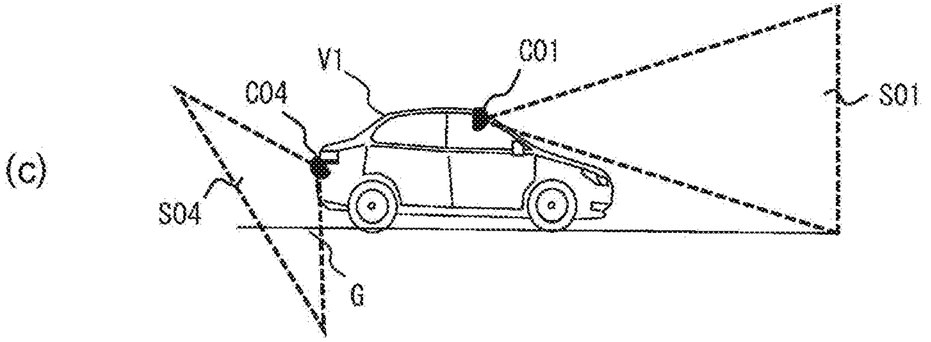

FIGS. 5(*a*), 5(*b*), and 5(*c*) are views illustrating examples of the installation positions of the cameras. FIG. 5(*a*) illustrates an example in which a tire of the vehicle V1 is not captured, FIG. 5(*b*) illustrates an example in which a tire of the vehicle V1 is captured, and FIG. 5(*c*) illustrates an example in which a camera is installed on the rear side of the vehicle V1.

The vehicle grounding road surface determination unit B02 determines whether the road surface on which the object M01 is positioned is the same as the grounding contact surface G of the vehicle V1. Specifically, the vehicle grounding road surface determination unit B02 determines whether a road surface on which the object M01 is positioned is present in the captured image and the grounding contact surface G of the vehicle V1 is included in the captured image. The vehicle grounding road surface determination unit B02 acquires information such as an attachment position and an angle of the camera from the image capturing information management unit A06. Then, the vehicle grounding road surface determination unit B02 determines whether the image capturing range of the camera includes the grounding contact surface G where the vehicle V1 is grounded with the traveling road surface, such as a tire of the vehicle V1. For example, as illustrated in FIG. 5(*a*), in a case of an angle of view forming the image capturing range S02 with the attachment position of the camera C02, it is determined that the position of the tire that is the grounding contact surface G is not captured. Note that when the image capturing range S02 is within a predetermined distance with respect to the grounding contact surface G, the image capturing range S02 is regarded as being within a range of an error, and is determined to have been captured.

On the other hand, for example, in the case illustrated in FIG. 5(*b*), it is determined that the grounding contact surface G where the vehicle V1 is grounded with the traveling road surface is captured. Whether or not the grounding contact surface G between the vehicle V1 and the traveling road surface is captured is determined in accordance with the attachment position, angle, and the like of the camera, and therefore, the correspondence relationship is stored in advance in the image capturing information management unit A06 in accordance with the attachment position, angle, and the like of the camera.

As illustrated in FIG. 5(*c*), when the camera C04 is attached to the rear side of the vehicle V1, the grounding contact surface G is often captured. Note that there is a case where the tire and the parking road surface the height are different in height from each other at the time of parking or the like, but the height of this parking road surface is corrected to obtain the grounding contact surface G. Note that as illustrated in FIG. 5(*c*), in the case of the camera C01 attached to the front side of the vehicle V1, the grounding contact surface G is not captured.

If the road surface on which the object M01 is positioned is the same as the grounding contact surface G of the vehicle V1, the road surface height reliability calculation unit B01 calculates the reliability high on an assumption that the road surface on which the object is positioned in the captured image is the same in height as the traveling road surface of the vehicle.

Using an image recognition technique such as semantic segmentation with respect to the captured image, the image attribute determination unit B03 determines an image region attribute of the image region used by the road surface height estimation unit A12. For example, the image region attribute is divided into a road region attribute in which the vehicle V1 is traveling and a non-road region attribute such as sidewalks other than that. Note that the function of analyzing the captured image to determine the image region attribute may be provided to the image analysis units A01, A02, and A03.

The road surface height reliability calculation unit B01 calculates the reliability of the road surface estimated for each position of the image or for each estimated vehicle center coordinate in accordance with the image region attribute determined by the image attribute determination unit B03. For example, if the attribute of the road surface on which the object is positioned is the road region attribute, the reliability of the height of the road surface by the road surface height estimation unit A12 is calculated high, and if the attribute is the non-road region attribute, the reliability is calculated low.

The road surface marking determination unit B04 analyzes the captured image, and determines whether there is a road surface marking represented by a white line, a stop line, a braille block, a crosswalk, a road sign, or the like on the road surface on which the object is positioned in the image region used by the road surface height estimation unit A12 or the region in which the object is detected. Note that the function of determining the road surface marking may be provided to the image analysis units A01, A02, and A03.

For example, when the region of the road surface on which the object is positioned is surrounded by a lane of a white line or when there is a crosswalk, based on the road surface marking determined by this road surface marking determination unit B04, it is determined that the object is present on the traveling road surface and the road surface height reliability calculation unit B01 calculates the reliability of the road surface height estimation unit A12 high. When there is a braille block or no road sign in the region of the road surface on which the object is positioned, it is determined that the object is present on the sidewalk, and the reliability of the road surface height estimation unit A12 is calculated to be low.

Figure 6:
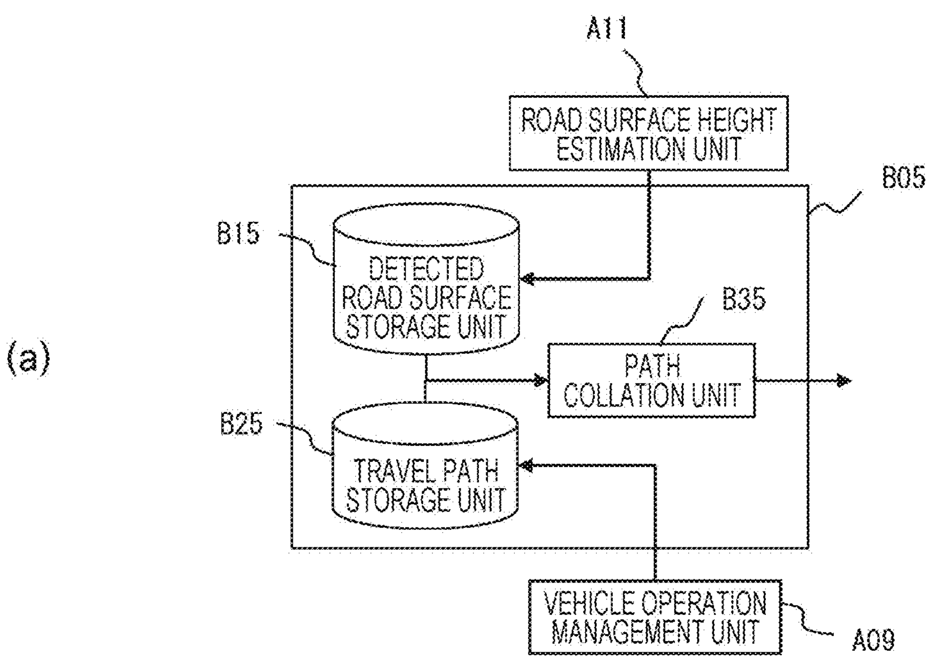
FIGS. 6(*a*) and 6(*b*) are views illustrating a travel history determination unit B05.
Figure 6:
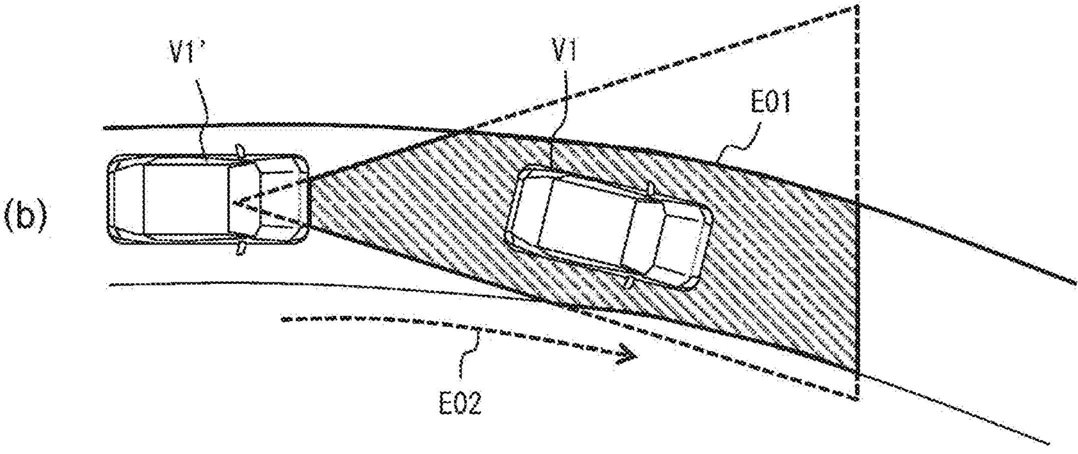

The operation of the travel history determination unit B05 will be described with reference to FIGS. 6(*a*) and 6(*b*). FIGS. 6(*a*) and 6(*b*) are views illustrating the travel history determination unit B05. FIG. 6(*a*) is a detailed configuration diagram of the travel history determination unit B05, and FIG. 6(*b*) is a view explaining a travel history of the vehicle V1.

As illustrated in FIG. 6(*a*), the travel history determination unit B05 includes a detected road surface storage unit B15, a travel path storage unit B25, and a path collation unit B35. The detected road surface storage unit B15 stores the captured image received from the road surface height estimation unit A11. The travel path storage unit B25 stores the traveling road surface on which the vehicle V1 has traveled, that is, the path of the vehicle V1, using the operation information of the vehicle V1 received from the vehicle operation management unit A09. Based on the detected road surface storage unit B15 and the travel path storage unit B25, the path collation unit B35 collates whether the captured image of the traveling road surface on which the vehicle V1 traveled in the past includes the same captured image as the image captured at the present time point, and outputs this to the road surface height reliability calculation unit B01 as a determination result.

Note that images captured by the cameras at respective positions on the traveling road surface of the vehicle V1 at a certain time in the past are stored in a captured image storage unit not illustrated. Then, the road surface height estimation unit A12 estimates the height of the road surface with reference also to past captured images stored in the captured image storage unit. For example, the road surface height estimation unit A12 estimates the height of the road surface using the clearest captured image among a plurality of current and past captured images at an identical position, or outputs the most frequent height of the road surface among the heights of the road surfaces estimated using the current and past captured images at the identical position. This enables the road surface height estimation unit A12 to enhance the estimation accuracy of the height of the road surface.

As illustrated in FIG. 6(*b*), it is assumed that a road surface region acquired as a captured image at a position of a vehicle V1' at a certain time t' in the past is E01. The travel path in this case is assumed to be E02. If the vehicle V1 is positioned in the road surface region E01 at and after the time t', the road surface region E01 is a region through which the vehicle V1 passed in the past. That is, the travel history determination unit B05 determines that the captured image of the traveling road surface on which the vehicle V1 traveled in the past includes the same captured image as the image captured at the present time point.

The road surface height reliability calculation unit B01 calculates the reliability of the road surface in accordance with the presence or absence of the travel history determined by the travel history determination unit B05. For example, if there is a travel history, that is, if a captured image of a traveling road surface traveled in the past is included, the estimation accuracy of the height of the road surface by the road surface height estimation unit A12 is high, and therefore, the reliability is calculated high, and if there is no travel history, the reliability is calculated low.

The other object presence determination unit B06 analyzes the captured image, and determines whether there is another object on the traveling road surface of the vehicle V1 in the captured image.

The road surface height reliability calculation unit B01 calculates the reliability of the height of the road surface by the road surface height estimation unit A12 in accordance with the presence of the other object determined by the other object presence determination unit B06. For example, if the other object on the traveling road surface is another vehicle and the other vehicle is present on the traveling road surface, it is determined that this traveling road surface is close to the grounding contact surface G of the vehicle V1, and the reliability of the height of the road surface by the road surface height estimation unit A12 is calculated high.

The distance/time series information determination unit B07 determines whether the other object in the captured image is present at a position close to the vehicle V1 in terms of distance or whether the captured image is an image at a time point close in terms of time series.

In the road surface height reliability calculation unit B01, this distance/time series information determination unit B07 calculates the reliability of the road surface in accordance with the presence of a captured image close in terms of distance and time series. For example, if the captured image is close in terms of time series and distance, it is determined that this captured image is reliable, and the reliability of the height of the road surface by the road surface height estimation unit A12 is calculated high.

The estimation principle determination unit B08 determines the type of measurement in which the height of the road surface is obtained by the road surface height estimation unit A12. For example, it is determined whether the measurement has been performed using a stereo camera or the measurement has been performed using parallax information or the like using a camera having an overlapping region with another camera. The measurement is not limited to that using the camera, and may be one using laser imaging detection and ranging (LIDAR).

The road surface height reliability calculation unit B01 calculates the reliability of the road surface in accordance with the determination as to whether highly reliable measurement has been performed by this estimation principle determination unit B08. For example, when highly reliable measurement has been performed, the reliability of the height of the road surface by the road surface height estimation unit A12 is calculated high.

In this manner, the road surface height reliability estimation unit A05 calculates the reliability of the height of the road surface using the determination results of the determination units B02 to B08. Then, the object distance information estimation unit A10 estimates the distance to the object in accordance with the reliability calculated by the road surface height reliability estimation unit A05. This can enhance the accuracy of the distance to the object based on the captured image with high reliability captured by the monocular camera.

Note that in the present embodiment, as an example, the reliability is represented by %. For example, if the reliability is 80%, the reliability is high, and if the reliability is 20%, the reliability is low. When the reliability is 50% or more, the reliability is determined to be relatively high. Note that the reliability is not limited to be represented by %, and may be indicated in another unit or value.

In the above description, an example in which the reliability is calculated using individual determination results of the determination units B02 to B08 has been described. However, a plurality of determination results of the determination units B02 to B08 may be integrated and determined to calculate the reliability. Hereinafter, Determination Examples 1 to 3 in which a plurality of determination results are integrated and determined will be described.

Figure 7:
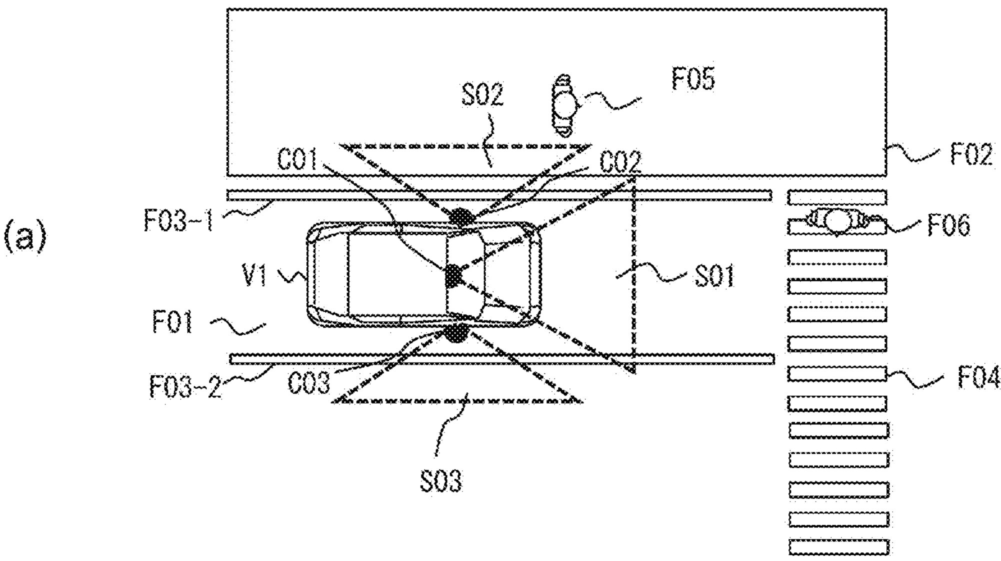
FIGS. 7(*a*) and 7(*b*) are views explaining Determination Example 1.
Figure 7:
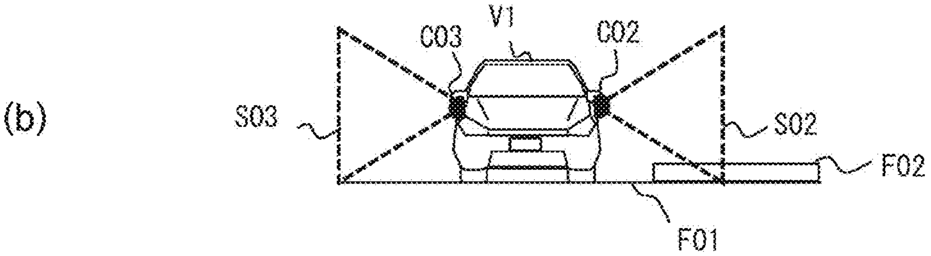

FIGS. 7(*a*) and 7(*b*) are views explaining Determination Example 1. FIG. 7(*a*) is a top view of the vehicle V1 in which the cameras C01, C02, and C03 are installed, and FIG. 7(*b*) is a front view of the vehicle V1.

As illustrated in FIG. 7(*a*), the camera C01 installed on the front side of the vehicle V1 captures an image capturing range S01 of the front. The camera C02 installed on the left side of the vehicle V1 captures an image capturing range S02 on the left side. The camera C03 installed on the right side of the vehicle V1 captures an image capturing range S03 on the right side.

An example in which a road F01, a sidewalk F02, white lines F03-1 and F03-2, and a crosswalk F04, a pedestrian F05 on the sidewalk F02, and a pedestrian F06 on the crosswalk F04 are present around the external environment of the vehicle V1 is given. Then, a case where the grounding contact surface G where the vehicle V1 is grounded with the traveling road surface is not within the image capturing ranges S01, S02, and S03 of the cameras C01, C02, and C03 is given.

The camera C01 on the front side captures the road F01, the crosswalk F04, the pedestrian F06 on the crosswalk F04, and the white lines F03-1 and F03-2, and detects each of the objects on the captured image. The camera C02 on the left captures the sidewalk F02 and the pedestrian F05 on the sidewalk F02, and detects each of the objects on the captured image. The camera C03 on the right side captures the white line F03-2, and the object is detected in the captured image. Then, the road surface height estimation unit A12 estimates and outputs, to the integration road surface analysis unit A04, the height of the road surface on which the object is positioned in the images captured by the cameras C01, C02, and C03.

The road surface height reliability estimation unit A05 of the integration road surface analysis unit A04 estimates the reliability of the height of the road surface estimated by the road surface height estimation unit A12. Specifically, the road surface height reliability estimation unit A05 integrates the respective determination results of the vehicle grounding road surface determination unit B02, the image attribute determination unit B03, and the road surface marking determination unit B04, and the road surface height reliability calculation unit B01 calculates the reliability of the height of the road surface.

The vehicle grounding road surface determination unit B02 determines that any of the cameras C01 and C02 has not captured the grounding contact surface G where the vehicle V1 is grounded with the traveling road surface. The image attribute determination unit B03 determines the road region attribute and the non-road region attribute in the captured image. Specifically, it is determined that the pedestrian F06 on the crosswalk F04 captured by the camera C01 is the road region attribute, and the pedestrian F05 on the sidewalk F02 captured by the camera C02 is the non-road region attribute. The road surface marking determination unit B04 determines whether there is a road surface marking in the captured image. Specifically, the road surface marking determination unit B04 determines that the pedestrian F06 captured by the camera C01 is on the crosswalk F04, and there is no road marking around the pedestrian F05 captured by the camera C02.

Upon receiving these determination results, the road surface height reliability calculation unit B01 calculates the reliability of the height of the road surface. Assuming that the reliability of the height of the road surface by the road surface height estimation unit A12 corresponding to the camera C01 is H01, and the reliability of the height of the road surface by the road surface height estimation unit A12 corresponding to the camera C02 is H02, determination is made as follows based on the determination results of the determination units B02 to B04.

Determination of the vehicle grounding road surface determination unit B02 is H01=20% and H02=20%

Determination of the image attribute determination unit B03 is H01=80% and H02=20%

Determination of the road surface marking determination unit B04 is H01=80% and H02=20%

Then, the road surface height reliability calculation unit B01 calculates, for example, an average of the reliabilities H01 and an average of the reliabilities H02 based on these determination results, and integrates the reliabilities as follows.

The road surface height reliability calculation unit B01 is H01=60% and H02=20%

That is, the road surface height reliability calculation unit B01 regards the reliability H01 of the height of the road surface by the road surface height estimation unit A12 corresponding to the camera C01 to be high, and the reliability H02 of the height of the road surface by the road surface height estimation unit A12 corresponding to the camera C02 to be low.

The object distance information estimation unit A10 estimates the distance to the object based on the integrated reliability. If the integrated reliability is high, the height of the road surface estimated corresponding to this camera is used. If the integrated reliability is low, the height of the road surface estimated corresponding to this camera is corrected in accordance with each condition to obtain the distance. For example, in a case of an object on a sidewalk having been captured, a height of the sidewalk having been determined in advance is added and used.

Note that in Determination Example 1, an example in which the reliability is calculated by integrating the determination results of the vehicle grounding road surface determination unit B02, the image attribute determination unit B03, and the road surface marking determination unit B04 has been described, but the reliability may be calculated based on at least one determination result of these determination units. Furthermore, the reliability may be calculated by integrating the determination results of the determination units B02 to B08, not limited to the vehicle grounding road surface determination unit B02, the image attribute determination unit B03, and the road surface marking determination unit B04. Although the reliability integrated by the average of the reliability is calculated, the reliability may be calculated by weighting the determination results of the determination units B02 to B08. In this case, the determination results of the determination units B02 to B08 are weighted in accordance with the degree of influence on the height of the road surface having been estimated.

According to Determination Example 1, by integrating the determination results of the determination units B02 to B08 and calculating the reliability, it is possible to enhance the accuracy of the distance to the object based on the image captured by the monocular camera.

Figure 8:
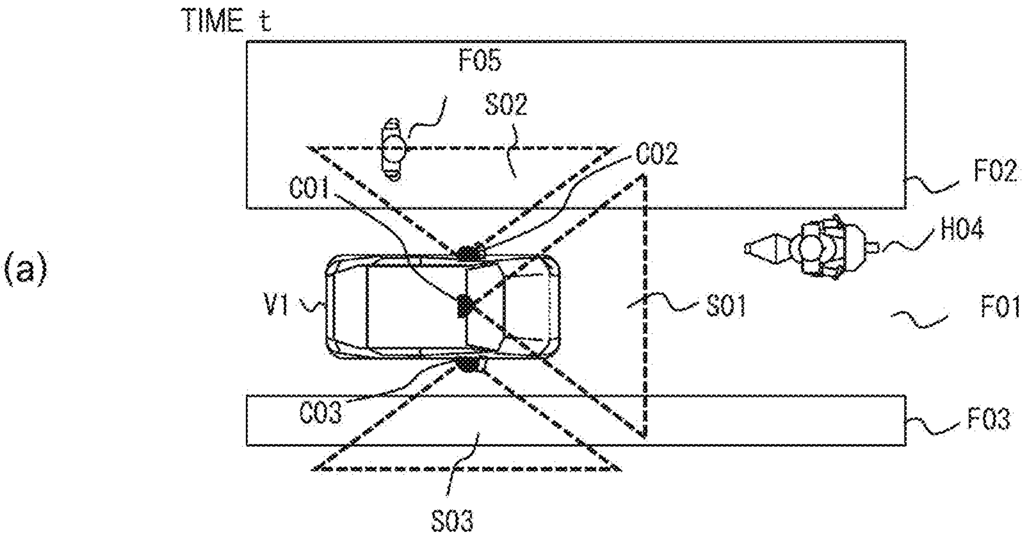
FIGS. 8(*a*), 8(*b*), and 8(*c*) are views explaining Determination Example 2.
Figure 8:
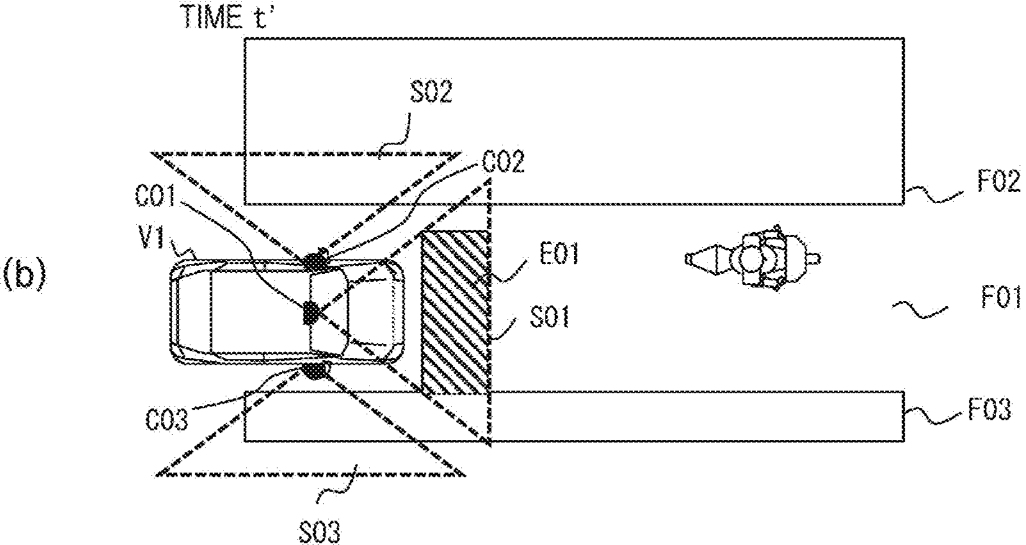
Figure 8:
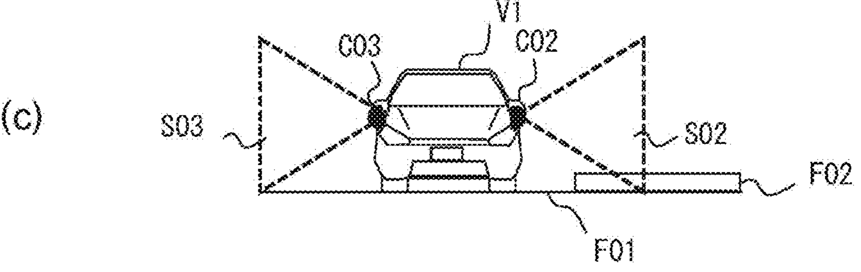

FIGS. 8(*a*), 8(*b*), and 8(*c*) are views explaining Determination Example 2. FIG. 8(*a*) is a top view at the current time t of the vehicle V1 in which the cameras C01, C02, and C03 are installed, FIG. 8(*b*) is a top view of the vehicle V1 at the time t' in the past, and FIG. 8(*c*) is a front view of the vehicle V1.

As illustrated in FIG. 8(*a*), at the current time t, the camera C01 installed on the front side of the vehicle V1 captures an image capturing range S01 of the front. The camera C02 installed on the left side of the vehicle V1 captures an image capturing range S02 on the left side. The camera C03 installed on the right side of the vehicle V1 captures an image capturing range S03 on the right side.

An example in which the road F01, the sidewalk F02, the white line F03, the pedestrian F05 on the sidewalk F02, and a motorcycle H04 are present around the external environment of the vehicle V1 is given. Then, a case where the grounding contact surface G where the vehicle V1 is grounded with the traveling road surface is not within the image capturing ranges S01, S02, and S03 of the cameras C01, C02, and C03 is given.

The camera C01 on the front side captures the road F01, the motorcycle H04, and the white line F03, and detects each of the objects on the captured image. The camera C02 on the left captures the sidewalk F02 and the pedestrian F05 on the sidewalk F02, and detects each of the objects in the captured image. The camera C03 on the right side captures the white line F03, and the object is detected in the captured image. Then, the road surface height estimation unit A12 estimates and outputs, to the integration road surface analysis unit A04, the height of the road surface on which the object is positioned in the images captured by the cameras C01, C02, and C03.

At the time t' in the past from the current time t, the vehicle V1 travels in the same place, and as illustrated in FIG. 8(*b*), the camera C01 on the front side captures the road F01 and the white line F03, the camera C02 on the left side captures the sidewalk F02, the camera C03 on the right side captures the white line F03, and the captured images are stored in the captured image storage unit not illustrated.

The road surface height reliability estimation unit A05 of the integration road surface analysis unit A04 estimates the reliability of the height of the road surface estimated by the road surface height estimation unit A12. Specifically, the road surface height reliability estimation unit A05 integrates the respective determination results of the travel history determination unit B05, the other object presence determination unit B06, and the distance/time series information determination unit B07, and the road surface height reliability calculation unit B01 calculates the reliability of the height of the road surface.

As described with reference to FIGS. 6(*a*) and 6(*b*), the travel history determination unit B05 determines that there is a travel history at the time t' in the past. Specifically, a captured image corresponding to the camera C01 is determined to have a history by traveling on the road surface region E01 of the same road F01. On the other hand, captured images corresponding to the cameras C02 and C03 are determined to have no travel history because the vehicle has not traveled on the road F01.

The other object presence determination unit B06 determines the presence of the motorcycle H04, which is another object on the road surface, in the captured image corresponding to the camera C01. On the other hand, the other object presence determination unit B06 determines that nothing is present because there is no other object on the road surface in the captured images corresponding to the cameras C02 and C03.

The distance/time series information determination unit B07 determines a far position because the motorcycle H04 is present at a position far from the vehicle V1 in terms of distance in the captured image corresponding to the camera C01. On the other hand, the distance/time series information determination unit B07 determines a close position because the pedestrian F05 is present at a close position in the captured image corresponding to the camera C02. The distance/time series information determination unit B07 determines a far position or cannot determine because no other object is present in the captured image corresponding to the camera C03.

Upon receiving these determination results, the road surface height reliability calculation unit B01 calculates the reliability of the height of the road surface. Assuming that the reliability of the height of the road surface by the road surface height estimation unit A12 corresponding to the camera C01 is H01, and the reliability of the height of the road surface by the road surface height estimation unit A12 corresponding to the camera C02 is H02, determination is made as follows based on the determination results of the determination units B05 to B07.

Determination of the travel history determination unit B05 is H01=80% and H02=20%

Determination of the other object presence determination unit B06 is H01=80% and H02=20%

Determination of the distance/time series information determination unit B07 is H01=20% and H02=80%

Then, the road surface height reliability calculation unit B01 calculates, for example, an average of the reliabilities H01 and an average of the reliabilities H02 based on these determination results, and integrates the reliabilities as follows.

Determination of the road surface height reliability calculation unit B01 is H01=60% and H02=40%

That is, the road surface height reliability calculation unit B01 regards the reliability H01 of the height of the road surface by the road surface height estimation unit A12 corresponding to the camera C01 to be high, and the reliability H02 of the height of the road surface by the road surface height estimation unit A12 corresponding to the camera C02 to be low.

The object distance information estimation unit A10 estimates the distance to the object based on the integrated reliability. If the integrated reliability is high, the height of the road surface estimated corresponding to this camera is used. If the integrated reliability is low, the height of the road surface estimated corresponding to this camera is corrected in accordance with each condition to obtain the distance.

Note that in Determination Example 2, an example in which the reliability is calculated by integrating the determination results of the travel history determination unit B05, the other object presence determination unit B06, and the distance/time series information determination unit B07 has been described, but the reliability may be calculated based on at least one determination result of these determination units. Furthermore, the reliability may be calculated by integrating the determination results of the determination units B02 to B08, not limited to the travel history determination unit B05, the other object presence determination unit B06, and the distance/time series information determination unit B07. Although the reliability integrated by the average of the reliability is calculated, the reliability may be calculated by weighting the determination results of the determination units B02 to B08. In this case, the determination results of the determination units B02 to B08 are weighted in accordance with the degree of influence on the height of the road surface having been estimated.

According to Determination Example 2, by integrating the determination results of the determination units B02 to B08 and calculating the reliability, it is possible to enhance the accuracy of the distance to the object based on the image captured by the monocular camera.

Figure 9:
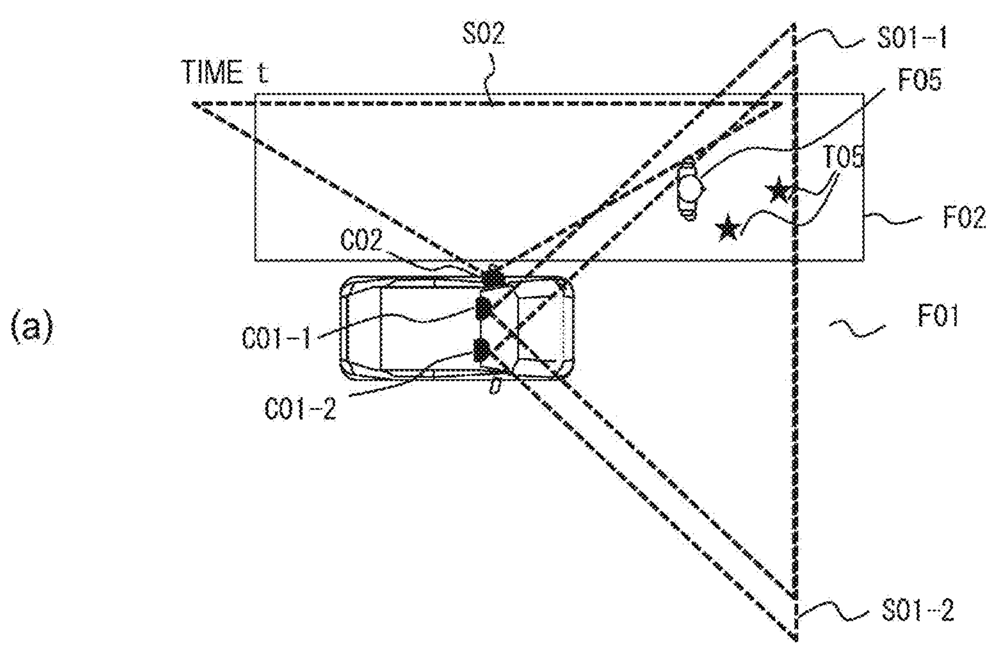
FIGS. 9(*a*) and 9(*b*) are views explaining Determination Example 3.
Figure 9:
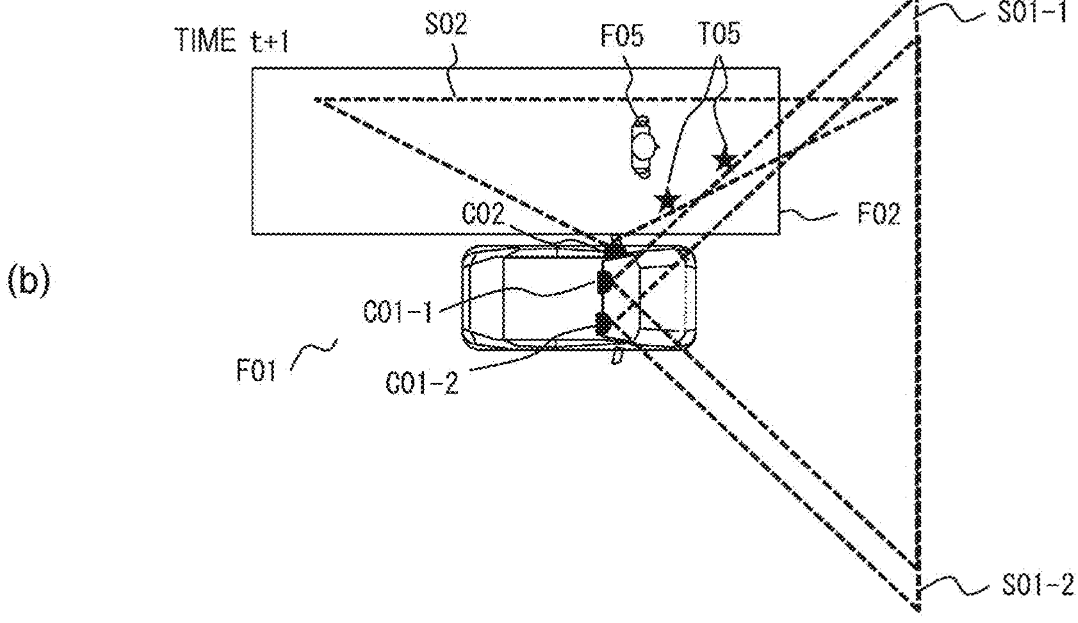

FIGS. 9(*a*) and 9(*b*) are views explaining Determination Example 3. FIG. 9(*a*) is a top view at the time t of the vehicle V1 in which cameras C01-1, C01-2, and C02 are installed, and FIG. 9(*b*) is a top view of the vehicle V1 at time t+1 after the time t has elapsed.

As illustrated in FIG. 9(*a*), one stereo camera C01-1 and one stereo camera C01-2 are attached to the front side of the vehicle V1, and one monocular camera C02 is attached to the left side of the vehicle V1. The stereo cameras C01-1 and C01-2 capture image capturing ranges S01-1 and S01-2 of the front. The monocular camera C02 captures the image capturing range S02 on the left side.

An example in which the road F01, the sidewalk F02, the pedestrian F05, and a feature point T05 are present around the external environment of the vehicle V1 is given. The pedestrian F05 is positioned on the sidewalk F02 that is a plane different in height from the road F01, which is a traveling road surface of the vehicle V1. The feature point T05 is a structure, configuration, or the like on the sidewalk F02, corresponds to a feature point extracted by image analysis on a captured image, and is acquired at an identical position on the sidewalk F02 even when time or the camera changes.

The stereo cameras C01-1 and C01-2 can perform three-dimensional measurement by the principle of triangulation. At the time t illustrated in FIG. 9(*a*), the road surface height estimation unit A12 obtains the heights of the traveling road surface on which the vehicle V1 is traveling and the road surface of the sidewalk F02 based on the images captured in the image capturing ranges S01-1 and S01-2 of the stereo cameras C01-1 and C01-2, and outputs the height of this road surface and the type of measurement to the integration road surface analysis unit A04 together with the captured image.

Of the road surface height reliability estimation unit A05 in the integration road surface analysis unit A04, the estimation principle determination unit B08 determines that the type of measurement in which the height of the road surface is obtained by the road surface height estimation unit A12 is measurement using the stereo camera. The road surface height reliability calculation unit B01 calculates the reliability of the height of the road surface to be high in accordance with the type of measurement determined by the estimation principle determination unit B08.

The road surface information integration unit A08 determines, stores, and manages, in time series, the height of the road surface from the information on the height of the road surface in the road surface height estimation unit A12 corresponding to the stereo cameras C01-1 and C01-2 and the monocular camera C02 and the estimation result of the road surface height reliability estimation unit A05. Specifically, the road surface information integration unit A08 associates the feature point T05 captured by the stereo cameras C01-1 and C01-2 at the time t with the feature point T05 observed by the monocular camera C02 at the time t+1 while the vehicle V1 transitions from the time t to the time t+1. The reliability of the road surface height estimated from the captured image by the monocular camera C02 is lower than the reliability of the road surface height estimated from the captured images by the stereo cameras C01-1 and C01-2. Therefore, height information by triangulation of the stereo cameras C01-1 and C01-2 at the time t is used as height information of the monocular camera C02 at the time t+1.

Note that the road surface height reliability estimation unit A05 may have the function of the road surface information integration unit A08 described above.

The object distance information estimation unit A10 estimates the distance to the object based on information with high reliability integrated by the road surface information integration unit A08 or the like.

In this manner, the distance can be estimated using road surface height information with high reliability. Note that in Determination Example 3, an example in which the stereo cameras C01-1 and C01-2 are used as measurement devices has been described, but a measurement device such as LIDAR with other measurement accuracy can be used.

According to Determination Example 3, by complementing the monocular camera with a measurement device with high measurement accuracy, it is possible to enhance the accuracy of the distance to the object based on the image captured by the monocular camera.

The external environment recognition device 100 described in the above embodiment has been described as a configuration including the image analysis units A01, A02, and A03, the integration road surface analysis unit A04, and the object distance information estimation unit A10. However, some or all of these configurations may be implemented by a processor (e.g., CPU or GPU) and a program executed by this processor. Since the program is executed by the processor to perform predetermined processing while appropriately using a storage resource (e.g., a memory) and/or an interface device (e.g., a communication port), the agent of the processing may be the processor. Similarly, the agent of processing performed by executing the program may be a controller, a device, a system, a computer, or a node having a processor. The agent of processing performed by executing the program is only required to be an arithmetic operation unit, and may also include a dedicated circuit (e.g., FPGA or ASIC) that performs specific processing.

The program may be installed to a device such as a computer from a program source. The program source may be, for example, a program distribution server or a computer-readable storage medium. When the program source is a program distribution server, the program distribution server may include a processor and a storage resource that stores a distribution target program, and the processor of the program distribution server may distribute the distribution target program to another computer. In the program, two or more programs may be implemented as one program, or one program may be implemented as two or more programs.

Information such as programs, tables, and files that implement some or all functions of the configuration of the external environment recognition device 100 can be stored in a storage device such as a memory, a hard disk, or a solid state drive (SSD), or a recording medium such as an IC card, an SD card, or a DVD. Control lines and information lines that are considered necessary for the description are illustrated, and not necessarily all control lines and information lines essential for implementation are illustrated. In reality, almost all the configurations may be considered mutually connected.

According to the embodiment described above, the following operational effects can be obtained.

(1) The external environment recognition device 100 includes: the road surface height estimation unit A12 that estimates a height of a road surface on which an object is positioned in an image captured by the monocular cameras C01, C02, and C03 installed in the vehicle V1; the road surface height reliability estimation unit A05 that calculates reliability of a height of the road surface estimated by the road surface height estimation unit A12; and the object distance information estimation unit A07 that estimates a distance to the object in accordance with the reliability calculated by the road surface height reliability estimation unit A05, in which the road surface height reliability estimation unit A05 calculates the reliability based on a determination result as to whether the road surface is the same as the grounding contact surface G of the vehicle V1. This can enhance the accuracy of the distance to an object based on an image captured by a monocular camera.

The present invention is not limited to the above-described embodiment, and various modes conceivable within the scope of the technical idea of the present invention are also included within the scope of the present invention as long as the features of the present invention are not impaired. The above-described embodiment and Determination Example 1 to Determination Example 3 may be combined. For example, the above-described embodiment has been described in detail for easy understanding of the present invention, and the present invention is not necessarily limited to those having all the described configurations.

REFERENCE SIGNS LIST

- A01, A02, A03 image analysis unit
- A04 integration road surface analysis unit
- A05 road surface height reliability estimation unit
- A06 image capturing information management unit
- A07 object distance information estimation unit
- A08 road surface information integration unit
- A09 vehicle operation management unit
- A10 object distance information estimation unit
- A11 object detection unit
- A12 road surface height estimation unit
- B01 road surface height reliability calculation unit
- B02 vehicle grounding road surface determination unit
- B03 image attribute determination unit
- B04 road surface marking determination unit
- B05 travel history determination unit
- B06 other object presence determination unit
- B07 distance/time series information determination unit
- B08 estimation principle determination unit
- B15 detected road surface storage unit
- B25 travel path storage unit
- B35 path collation unit
- C01, C02, C03 camera
- V1 vehicle
- 100 external environment recognition device

The invention claimed is:

1. An external environment recognition device, comprising:

- a road surface height estimation unit that estimates a height of a road surface on which an object is positioned in an image captured by a monocular camera installed in a vehicle;
- a road surface height reliability estimation unit that calculates reliability of a height of the road surface estimated by the road surface height estimation unit; and
- an object distance information estimation unit that estimates a distance to the object in accordance with the reliability calculated by the road surface height reliability estimation unit, wherein the road surface height reliability estimation unit calculates the reliability based on a determination result as to whether the road surface is same as a grounding contact surface of the vehicle.

2. The external environment recognition device according to claim 1, wherein the road surface height reliability estimation unit enhances reliability of a height of the road surface when the road surface is same as a grounding contact surface of the vehicle.

3. The external environment recognition device according to claim 1, wherein the road surface height reliability estimation unit divides the captured image into a road region attribute and a non-road region attribute, and enhances reliability of a height of the road surface when an attribute of the road surface on which the object is positioned is the road region attribute.

4. The external environment recognition device according to claim 1, wherein the road surface height reliability estimation unit determines whether there is a road surface marking on the road surface on which the object of the captured image is positioned, and enhances reliability of a height of the road surface when there is the road surface marking.

5. The external environment recognition device according to claim 1, wherein the road surface height reliability estimation unit collates whether the captured image includes the captured image of a traveling road surface on which the vehicle has traveled in past, and when the captured image in past is included, calculates reliability of a height of the road surface with reference to the captured image in the past.

6. The external environment recognition device according to claim 1, wherein the road surface height reliability estimation unit determines whether another object is present on a traveling road surface of the vehicle in the captured image, and when another object is present, calculates reliability of a height of the road surface to be high.

7. The external environment recognition device according to claim 1, wherein the road surface height reliability estimation unit determines a type of measurement in which a height of the road surface is obtained by the road surface height estimation unit, and calculates reliability of a height of the road surface in accordance with the type of the measurement.

8. The external environment recognition device according to claim 1, wherein the road surface height reliability estimation unit determines whether a grounding contact point between the vehicle and a traveling road surface is included in the captured image, divides the captured image into a road region attribute and a non-road region attribute, determines an attribute of the road surface on which the object is positioned, determines whether there is a road surface marking on the road surface on which the object is positioned in the captured image, and calculates the reliability based on at least one determination result of these determinations.

9. The external environment recognition device according to claim 1, wherein the road surface height reliability estimation unit determines whether the captured image includes the captured image of a traveling road surface on which the vehicle has traveled in past, determines whether another object is present on the traveling road surface of the vehicle in the captured image, and calculates the reliability based on at least one determination result of these determinations.

10. The external environment recognition device according to claim 1, wherein the road surface height reliability estimation unit determines a type of measurement in which a height of the road surface is obtained by the road surface height estimation unit, and in a case where accuracy of the measurement is high, uses a height of the road surface based on a captured image of a measurement device with high accuracy of the measurement as a height of the road surface based on an image captured by the monocular camera.

* * * * *